United States Patent [19]
Willett

[11] 3,708,746
[45] Jan. 2, 1973

[54] SYSTEM FOR SPECTRUM ANALYSIS INCLUDING DIGITAL FILTER WITH VARIABLE SAMPLING RATE

[75] Inventor: Richard M. Willett, Boone, Iowa

[73] Assignee: Iowa State University Research Foundation, Inc., Ames, Iowa

[22] Filed: Nov. 8, 1971

[21] Appl. No.: 196,675

[52] U.S. Cl. ............ 324/77 D, 244/77 M, 324/78 F, 328/167
[51] Int. Cl. ............................................. G01r 23/16
[58] Field of Search ....... 324/77 E, 77 D, 77 B, 78 D, 324/78 E, 78 F, 78 J; 328/167; 244/77 M

[56] References Cited

UNITED STATES PATENTS 2,851,661  9/1958  Buland ........................... 324/77 E
3,167,710  6/1965  Cox ................................ 324/77 E
3,588,693  6/1971  Halley et al. ................... 324/77 B Primary Examiner—Stanley T. Krawczewicz
Attorney—James J. Hill

[57] ABSTRACT

A system for analyzing the frequency spectrum of an input signal includes a digital filter, the center frequency of which is varied by changing the sampling rate. The output signal of the digital filter is squared in a detector circuit; and the output signal of the detector circuit is fed to an integrator circuit. The integration time is varied inversely proportional to the center frequency of the digital filter to obtain a signal representative of the power spectrum of the input signal.

5 Claims, 2 Drawing Figures

SYSTEM FOR SPECTRUM ANALYSIS INCLUDING DIGITAL FILTER WITH VARIABLE SAMPLING RATE

BACKGROUND AND SUMMARY

The present invention relates to a spectrum analyzer— that is, a system for determining the frequency components of an input wave form. Typically, the input wave form is an analog electrical signal Spectrum analyzers of the type with which the present invention is concerned may be used in determining the dynamic response of a flexible airframe, although it is not so limited in its broader aspects. The dynamic response of the airframe of modern aircraft and missiles which operate over an extremely wide range of altitudes, velocity and load, may vary widely. Normally, the "dynamic response" of an airframe is given analytically in terms of a transfer characteristic or transfer function which, by a determination of the poles and zeros thereof indicates the natural oscillating frequencies as well as the damping characteristics of the airframe. The poles of the transfer function due to bending of the airframe have different natural frequencies, and they vary with time due to changes in velocity, altitude, on-board fuel, etc. Further, these poles are very close to the imaginary axis when plotted in the s-plane, indicating a low damping factor.

The airframes of aircraft and missiles of this type are stabilized by determining the exact oscillating mode of the airframe and then feeding signals to the air-frame by means of a digital controller to stabilize it. Such a system is disclosed in U. S. Pat. No. 3,572,618 of Richard M. Willett entitled "Method for Stabilizing Aircraft and Missiles." This application discloses an adaptive control system for stabilizing an airframe wherein the actual airframe transfer function is continuously determined during the flight; and this determination is used to stabilize the dynamics of the airframe as they actually exist. It therefore becomes necessary to determine the transfer function of the airframe in real time during flight; and this entails measuring the frequency spectrum of signals picked up by sensors attached to the airframe and representative of the actual bending modes of the airframe. This application further discloses that the variation in sampling rate for a digital filter may compensate for changes in the natural frequency of the body bending modes of a flexible airframe. Hence, the pole positions of the bending poles can be kept at approximately the same position in the z-plane by varying the sampling rate of the digital filter, even though the natural frequency and position of these poles may change considerably in the s-plane.

The present invention is directed to determining the process (i.e., transfer function) of the bending modes of a flexible airframe, and in a broader sense, in determining the frequency spectrum of an analog electrical signal.

In the present invention, a narrow band digital filter receives the input analog signal being analyzed and generates a signal representative of the amplitude of the input signal within the narrow band of the filter. The sampling rate of the filter is varied in a predetermined manner so that the bandwidth of the filter is swept through the frequency spectrum of interest. Thus, as the sampling rate is changed, the output signal of the digital filter is representative of the amplitude of the input signal for the various frequencies of interest. The output of the digital filter is then squared to generate signals, each representative of the power density in a different, predetermined band; and the output of the squaring circuit is fed to an integrator circuit.

The integration time is varied inversely proportional to the center frequency of the narrow band of the digital filter, thereby to generate a signal which is representative of the power spectrum of the input signal and which compensates for the increasing bandwidth of the digital filter as its sampling frequency increases.

Persons skilled in the art will appreciated that the present invention may be employed for uses other than the one disclosed from the following detailed description, accomplished by the attached drawing.

THE DRAWING

FIG. 1 is a functional block drawing of a system constructed according to the present invention; and FIG. 2 is a graph depicting the relative bandwidth of a digital filter as a function of the center frequency of the filter.

DETAILED DESCRIPTION

Figure 1:
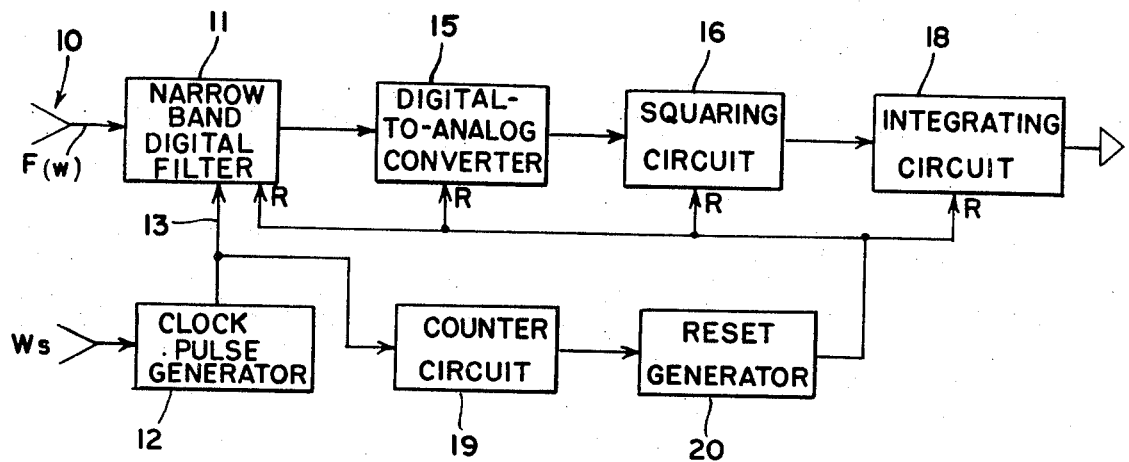

Referring then to FIG. 1, reference numeral 10 generally designates an input port or terminal on which there is present a signal, $F(\omega)$, which is an analog electrical signal, the frequency spectrum of which is desired to be analyzed. The signal is fed into a narrow band digital filter 11.

Digital filters are well-known in the art. They are real-time special-purpose digital computers which may be programmed so as to exhibit a desirable transfer characteristic. The co-efficients of the filter for a desired function are simply entered into a program controlling the operation of the filter, and it is operated by means of an external clock pulse generator 12 which generates output pulses transmitted along a line 13 to the digital filter 11 to control the sampling rate. That is, the sampling rate of the digital filter 11 is determined by the pulse rate of the clock pulse generator 12. The pulse rate of the clock pulse generator 12, in turn, is controlled by a signal $\omega_s$. The control signal $\omega_s$ is itself programmed to increase the pulse rate of the block pulse generator 12 according to a predetermined pattern. In the case of analyzing the frequency spectrum of a flexible air frame, the input signal $F(\omega)$ may be generated by a transducer attached to the airframe and generating an electrical signal proportional to the intensity of the instantaneous vibration of the airframe. The control signals $\omega_s$ may be generated by an on-board computer which also computes the bending modes of the airframe.

A digital filter which may be used as the digital filter 11 of the disclosed embodiment is described in an article entitled "Programable Digital Filter Performs Multiple Functions" by A. T. Anderson, in *Electronics*, Oct. 26, 1970.

The output of the digital filter 11, then, is a set of digital signals representative of the amplitude of the input wave form $F(\omega)$ in the narrow band of the filter; and it is fed to a digital to analog converter 15 for generating an analog signal representative thereof. Digital to analog converters are well-known in the art, and any suitable such circuit may be employed in the present invention. The output signal of the digital to analog convertor 15 is then coupled to a squaring circuit 16 which may be an analog circuit which generates an output signal representative of the square of the input signal. A typical circuit used as the squaring circuit 16 may be a detector circuit used in conventional receivers for frequency modulated signals. Such circuits normally bias a semi-conductor diode in the region wherein the current through it is proportional to the square of the voltage across the diode terminals, thereby generating a current signal representative of the square of the input voltage.

The output of the squaring circuit 16 is coupled to the input of an analog integrating circuit 18. Analog integrating circuits are also well-known in the art, and they are used commonly in analog computers. Alternatively, the squaring and integrating functions just mentioned could be performed with digital circuits constructed by techniques known to persons skilled in this art.

The output signal of the clock pulse generator 12 is also coupled to a digital counter circuit 19 which may be a string of flip-flop circuits connected to form a serial counter to count the input pulses. The output of the digital counter circuit 19 is connected to the input of a reset generator circuit 20. When the digital counter circuit 19 reaches a predetermined count, representative of a predetermined number of output pulses of the clock generator 12 (and, hence, related to a similar predetermined number of sampling intervals for the digital filter 11), the reset generator 20 generates an output to reset the digital filter 11, the digital to analog converter 15, the squaring circuit 16, and the analog integrating circuit 18.

Digital filters, as in the case of a bandpass filter tuned to a discrete frequency, are completely analytically described by their transfer functions. For a fixed location of poles and zeros in the z-plane, the product of the sampling period and the center frequency of the filter is a constant. That is to say, $$\omega_c T = k \qquad (1)$$

where
$\omega_c$ is the center frequency of the digital filter,
$T$ is the sampling period, and
$k$ is a constant.

It will be noted from the above equation that if the sampling rate of the filter is changed, its center frequency will also be changed. Hence, the spectrum analyzer of the present invention, in operation, uses this variation of the sampling rate to sweep the center frequency of the digital filter through the desired frequency spectrum of interest. This is done, of course, in discrete steps. That is to say, referring to FIG. 2, if the sampling period is $T_1$, the center frequency of the filter is $\omega_{c1}$, and the bandpass of the digital filter is diagrammatically illustrated by the graph 23. If the period of sampling is decreased (that is, the sampling frequency is increased) to a value $T_2$, then the center frequency of the digital filter 11 will be correspondingly increased to $\omega_{c2}$, according to the relationship of equation 1 above. The new bandpass of the digital filter is diagrammatically illustrated by the curve 24.

As mentioned, the output signal of the digital filter is representative of amplitude, and after it is squared in the squaring circuit 16, it is representative of the power spectrum of the signal within the bandpass of the filter. The output signal of the squaring circuit is then integrated for a fixed number of samples to generate a signal representative of the power spectral density of the input signal, $F(\omega)$ at the center frequency of the filter. That is to say, $$G(nT) \cong \frac{1}{N} \int_0^{NT} [y(nT)]^2 d(nT) \qquad (2)$$

where
$N$ is the number of samples,
$G(nT)$ is the power spectral density of the output signal, and
$y(nT)$ is the output of the digital filter.

Figure 2:
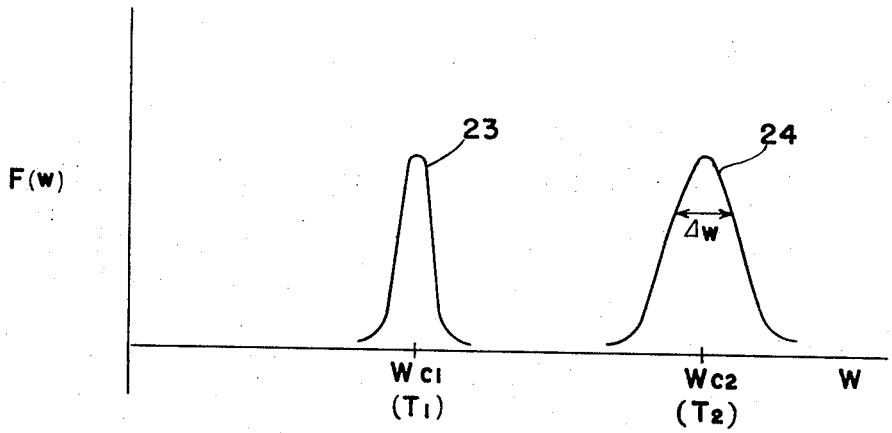

The Q (a figure of merit) of a bandpass filter is defined as the ratio of its center frequency, $\omega_c$, to the difference between frequencies at the half-power points on its bandwidth curve, denoted $\Delta\omega$ for the curve 24 of FIG. 2.

For each fixed location of poles and zeros, a filter has a fixed and constant value of Q whether it is a digital filter or a lumped constant parameter filter. As the center frequency of the filter changes, the bandwidth of the filter changes proportionally. That is to say, as the center frequency of the digital filter 11 changes from $\omega_{c1}$ of FIG. 2 to $\omega_{c2}$, the bandwidth of the curve 23 changes proportionally. Hence, the energy content of the output signal of the digital filter will depend upon the number of frequency components of the input signal which are present within the frequency range of the filter. Since the bandwidth of the filter is higher when the center frequency is raised, the energy content of the output signal will also be higher provided that the input signal has a constant spectral density function, for example, white noise, as is the case in bending modes for an airframe.

The present invention compensates for the changing bandwidth of the filter characteristic by changing the integration time of the integrating circuit 18 inversely proportional to the center frequency of the digital filter 11. That is to say, the digital counter circuit 19 actuates the reset generator 20 after a preset number of clock pulses are sensed, irregardless of the repetition rate of those clock pulses. Hence, as the center frequency of the digital filter 11 is increased by increasing the sampling rate (which is the pulse rate of the clock pulse generator 12) the integrating time is correspondingly reduced because the integration time is determined by the number of clock pulses, not a preset time.

The bandwidth of a bandpass filter in spectrum analysis plays a very important role. In order to obtain an accurate power spectral density analysis of the input signal by a digital filter, a filter having a narrow bandwidth is preferable to one having a relatively wide bandwidth. However, the response time of the filter increases as its bandwidth decreases. Thus, an engineering trade-off must be made in designing the filter.

In one computer simulation of a typical problem, the bandwidth of the bending mode of an airframe was determined from a prior analysis, and a second-order filter was considered to be narrow enough to be suitable. The final transfer function of the desired bandpass digital filter was derived from a conventional continuous, second-order Butterworth low-pass filter. Transfer function of this lowpass filter (normalized to one radian per second) was determined to be:

$$\frac{1}{(s+0.7071068+j0.7071068)(s+0.7071068-j0.7071068)} \quad (3)$$

Transformation from a continuous lowpass filter to a continuous bandpass filter was then made by using the relation $$si = (\beta/2) \rho i \pm J(\omega_c \pm (\beta/2) \Omega_i) \quad (4)$$

where
- $\beta$ was the desired bandwidth of the continuous bandpass filter,
- $\omega_c$ was the desired center frequency of the continuous bandpass filter,
- $\rho_i$ was the real part of the $i^{th}$ root of the continuous lowpass filter, and
- $\Omega_i$ was the imaginary part of the $i^{th}$ root of the continuous lowpass filter.

In our case, an arbitrary choice of bandwidth and center frequency was made. A bandwidth of 0.20 radians/second was chosen at the center frequency of 12 radians/second of the desired Butterworth bandpass filter. The transfer function of the equivalent fourth-order bandpass filter from the lowpass filter for the above-mentioned bandwidth and center frequency was found to be $$\frac{1}{(s+0.07071068 \pm j12.07071068)(s+0.07071068 \pm j11.92928932)} \quad (5)$$

The transfer function of the bandpass filter in z-domain was computer by the computer program CNVRT disclosed in the thesis of R. M. Willett, "Sample-Data Control Utilizing Variable Sampling Rate," available in the library of Iowa State University at Ames, Iowa (1966), and is given in equation (6). The sampling time of 0.0436 seconds was chosen for the greater frequency, $\omega_c$, of the filter at 12 radians/second.

$$D(z) = \frac{0.03945239[z(z-0.9220736)(z-1.084837)]}{(z-0.8620185 \pm j0.5007765)(z-08650899 \pm j0.4954518)} \quad (6)$$

The frequency response of the filter was computed with the help of a computer program given in Appendix C of the Master's Thesis of R. P. S. Bhatia, "An Investigation of Spectrum Analysis by Means of a Digital Filter with Variable Sampling Rate," available in the library of Iowa State University, Ames, Iowa (November 1970). In order to avoid the effect of frequency aliasing the frequency range for this computation was chosen such, that only one peak occurred in that range.

As a general rule, the sample rate or frequency should always be at least twice the bandwidth of the input signal being analyzed for the lowest sample frequency. Multiple digital filters may be used covering different frequency ranges if it is not.

Having thus described in detail a preferred embodiment of the inventive system, persons skilled in the art will be able to modify certain of the structure which has been illustrated and to substitute equivalent elements for those disclosed while continuing to practice the principle of the invention; and it is, therefore, intended that all such modifications and substitutions be covered as they are embraced within the spirit and scope of the appended claims.

I claim:

1. A system for analyzing the spectrum of an input time-varying electrical signal comprising: digital filter means receiving said input signal and generating an output signal representative of the amplitude of said input signal within a predetermined bandwidth, said filter means being characterized in that the center frequency of said filter varies with the sampling rate, said filter further being adapted to have a variable sampling rate; squaring circuit means receiving the output signal of said digital filter means for generating a signal representative of the square of said output signal and thereby representative of the power spectrum of said input signal; means for varying the sample rate of said digital filter means; and counter circuit means for decreasing the integration time of said integration circuit means as said sampling rate increases.

2. The system of claim 1 wherein said counter circuit means includes a digital counter circuit counting the sampling rate pulses for resetting said integration circuit means when a predetermined number of sample rate pulses have been counted.

3. The system of claim 1 wherein said digital filter means is characterized in having a relatively narrow bandpass.

4. A system for determining the frequency components of an input electrical signal comprising: narrow band digital filter means receiving said input signal for generating an output signal representative of the frequency components of said input wave form within the narrow band of said digital filter means; squaring circuit means receiving output signals of said digital filter means for generating a signal representative of the square thereof; integrator circuit means receiving the output signal of said squaring circuit means for integrating the same over a predetermined time; means for varying the sampling rate of said digital filter means to thereby change the center frequency of the bandwidth of said digital filter means; and counter circuit means responsive to the sampling rate of said digital filter means for resetting said integrating circuit means after a predetermined number of sample rate pulses whereby as the center frequency of the bandwidth of said digital filter means increases, the integration time of said integrating circuit means decreases.

5. In a method of determining the frequency spectrum of an input signal, the steps comprising processing said signal in a narrow band digital filter, squaring the output signal of said digital filter, then integrating said squared signal, and incrementally increasing the sampling rate of digital filter while correspondingly decreasing the integration time of said squared signal to generate a set of signals representative of the energy content of said input signal at predetermined bandwidths over a spectrum.

* * * * *